United States Patent
Pacheco et al.

[19]

[11] Patent Number: 6,126,826

[45] Date of Patent: *Oct. 3, 2000

[54] PVDF MICROPOROUS MEMBRANE AND METHOD

[75] Inventors: Manuel M. Pacheco; John F. Pacheco, both of Billerica, Mass.

[73] Assignee: Whatman Inc., Haverhill, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/906,074

[22] Filed: Aug. 5, 1997

Related U.S. Application Data

[63] Continuation-in-part of application No. 08/339,116, Nov. 10, 1994, abandoned, which is a continuation-in-part of application No. 08/279,340, Jul. 22, 1994, abandoned, which is a continuation of application No. 07/879,200, May 6, 1992, abandoned.

[51] Int. Cl.[7] .................................................... B01D 39/00
[52] U.S. Cl. .............................. 210/500.42; 210/500.27; 264/41; 264/215; 264/216; 264/233
[58] Field of Search .............................. 210/500.42, 490, 210/500.23, 500.27; 264/41, 215, 216, 233; 95/43, 45; 96/4; 521/64, 905

[56] References Cited

U.S. PATENT DOCUMENTS

| | | | |
|---|---|---|---|
| 4,203,848 | 5/1980 | Gradine, II | 210/500.42 |
| 4,384,047 | 5/1983 | Benzinger et al. | 264/41 |
| 4,399,035 | 8/1983 | Nohmi et al. | 210/500.42 |
| 5,013,339 | 5/1991 | Mahoney et al. | 210/500.23 |
| 5,708,040 | 1/1998 | Hong et al. | 210/500.42 |
| 5,736,051 | 4/1998 | Degen et al. | 210/500.42 |

*Primary Examiner*—Ana Fortuna
*Attorney, Agent, or Firm*—Daniel P. Cillo; Eckert Seamans Cherin & Mellott, LLC

[57] ABSTRACT

Methods for making microporous polyvinylidene fluoride (PVDF) membranes from vinylidene fluoride polymers and the products produced. The PVDF microporous membranes have a significantly faster flow rate at a given pore size as compared to equally-sized microporous membranes made by conventional procedures. The PVDF microporous membranes also have significantly smaller pore sizes than conventional microporous PVDF membranes. The present membranes have unique macrostructural features responsible, in part, for their unique functional properties. The process includes dissolving the polymer in a liquid that includes a solvent and a co-solvent for the polymer. The dissolution of the polymer can be at temperatures ranging from about 20°C. to about 50°C. while the formation of the microporous membrane can be at temperatures ranging from about −10°C. to 50°C. Selection of appropriate operating parameters of temperature and solvent/co-solvent concentration can optimize the membrane at a given nominal pore size, flow rate, and polymer distribution.

14 Claims, 2 Drawing Sheets

PVDF MICROPOROUS MEMBRANE AND METHOD

This application is a continuation-in-part of application Ser. No. 08/339,116, filed on Nov. 10, 1994 abandoned, which is a continuation-in-part of application Ser. No. 08/279,340, filed on Jul. 22, 1994, abandoned, which is a continuation of application Ser. No. 07/879,200, filed on May 6, 1992, now abandoned.

BACKGROUND OF THE INVENTION

1. Field of the Invention

The invention relates to polyvinylidene fluoride microporous membranes and methods for their production. In particular, the invention relates to microporous polyvinylidene fluoride membranes that differ significantly in both their structural and functional characteristics from conventional polyvinylidene fluoride microporous membranes.

2. Description of the Prior Art

Polyvinylidene fluoride microporous membranes, generally formed as thin sheets of substantially uniform thickness, have a sponge-like internal structure containing millions of channels. These channels define a tortuous flow path for liquids from one side of the membrane sheet to the other side. Conventional methods of producing these polyvinylidene fluoride (hereinafter "PVDF") membranes result in membranes having a matrix of intercommunicating channels, the channels having a substantially uniform width within narrow limits.

Microporous membranes act as screens or sieves and retain on their surface all particles larger than the given width of a channel (i.e. pore diameter). Entrapment on the membrane surface of particles of approximately the pore diameter will rapidly plug the membrane irreversibly, leading to rapid decline in flow rate. Due to the tortuous nature of the flow channels in conventional microporous membranes, significant hydraulic pressure is needed to force liquids from one side of the membrane to the other. As the membranes clog, this pressure necessarily increases.

Conventionally-produced PVDF membranes are commercially available with average pore sizes (i.e. pore diameters) in the range from about 0.10 microns to about 5.0 microns. The smallest of these conventional pore sizes will retain some large viruses and most bacteria However, most viruses and some bacteria are not retained. In addition, the smallest of these conventional pore sizes will not retain large macromolecules. Attempts to produce microporous membrane filters having pore sizes less than about 0.10 micron have generally led to problems of very slow flow because of the small pore size, and to problems of rapid plugging.

A conventionally-produced PVDF membrane is disclosed by Mahoney, in U.S. Pat. No. 5,013,339. The reference discloses a composition used in preparing microporous PVDF polymer membranes. The average pore size of the microporous membranes disclosed in the reference is from about 0.05 micron to about 10.0 microns. The reference further discloses that the membranes produced are used for liquid separation processes such as microfiltration, ultrafiltration, dialysis, and membrane stripping. It is noted that ultrafiltration and microfiltration are pressure driven processes using porous membranes in which particles or solutes are separated from solutions. The reference notes that these membranes may be characterized by their hydraulic permeability and sieving coefficient. The reference defines hydraulic permeability as a flow rate, such as gallons/ft.$^2$/day (GFD) at a given pressure. More specifically, hydraulic permeability is defined as the volume of a solvent transported through the membrane under the influence of a pressure gradient. The membranes disclosed in the Mahoney reference preferably have a hydraulic permeability for water, at 25° C., of at least about 10.0 ml/m$^2$/hr/cmHg.

Conventional solvent-casting procedures for producing microporous PVDF membranes rely on the use of a solvent such as acetone for the PVDF polymer. Nevertheless, acetone is usually not thought of as a solvent for this particular polymer because it is exceedingly difficult to dissolve any appreciable quantity of PVDF in acetone at room temperature. In order to dissolve a sufficient quantity to form an adequately viscous solution for use in practicing conventional methods, the acetone must be heated close to its boiling point of about 50° C. This produces severe constraints on conventional methods since the initial mixing of PVDF must occur at an elevated temperature.

SUMMARY OF THE INVENTION

The present invention embraces a family of microporous PVDF membranes that substantially differ from conventional PVDF membranes in their pore size, methanol bubble point, flow rate, and surface area The process for making these unique microporous PVDF membranes includes the use of solvents and temperatures that can be varied over a wide range and that are chosen to permit formation of membranes with a variety of structural and functional properties.

One embodiment of the present invention features a microporous membrane. The membrane receives fluids under a pressure gradient to define a flow of fluid through the membrane. The membrane comprises a sheet having a front surface for receiving fluid, a back surface through which said fluid exits and a distance between the front and back surface defining the membrane thickness. The membranes have a nominal pore size and are capable of receiving water for filtration. Embodiments of the present invention have a range of pore sizes which are unique. Such pore sizes range from 4.0 to 6.0 microns to 0.018 to 0.03 microns.

One embodiment of the present invention features a microporous membrane having a nominal pore size of 4.0 to 6.0 microns approximately 4.0 microns. The sheet has a thickness of 80 to 150 microns and is capable of receiving approximately 240 to 380 ml. of H$_2$O per minute per cm$^2$ of the front surface of the membrane, under a pressure gradient of 8 to 10 pounds per square inch.

One further embodiment of the membrane comprises a sheet of polyvinylidene fluoride having a nominal pore size of 2.0 to 4.0 microns, approximately 3.0 microns. The sheet has a thickness of 80 to 150 microns and is capable of receiving approximately 150 to 240 ml. of H$_2$O per cm$^2$ of the front surface of the membrane under a pressure gradient of 8 to 10 pounds per square inch.

One further embodiment of the membrane comprises a sheet of polyvinylidene fluoride having a nominal pore size of 1.4 to 2.7 microns, approximating 2.0 microns. The sheet has a thickness of 80 to 150 microns and is capable of receiving approximately 190 ml. of H$_2$O per minute per cm$^2$ of the front surface of the membrane under a pressure gradient of 8 to 10 pounds per square inch.

A further microporous membrane of the present invention comprising a sheet of polyvinylidene fluoride having a nominal pore size of 0.60 to 0.85 microns, approximating 0.65 microns. The sheet has a thickness of 80 to 150 microns and is capable of receiving approximately 50 ml. of water per minute per cm² of the front surface under a pressure gradient of 8 to 10 pounds per square inch.

A further embodiment of the present invention features a sheet of polyvinylidene fluoride having a nominal pore size of 0.14 to 0.22 microns, approximating a nominal pore size of 0.22 microns. The sheet has a thickness of 80 to 150 microns and is capable of receiving 10 ml. of water per minute per cm² of the front surface of the sheet under a pressure gradient of 8 to 10 pounds per square inch.

A further embodiment of the present invention features a sheet of polyvinylidene fluoride having a nominal pore size of 0.08 to 0.112 microns, approximating 0.10 microns. The sheet has a thickness of 80 to 150 microns and is capable of receiving 4 ml. of water per minute per cm² of front surface of the sheet under a differential pressure of 8 to 10 pounds per square inch, approximately 8 pounds per square inch.

A further embodiment of the present invention features a sheet of polyvinylidene fluoride having a nominal pore size of 0.03 to 0.06 microns, approximating a pore size of 0.05 microns and a thickness of 120 microns capable of receiving approximately 2 ml. of water per minute per cm² of the front surface of the membrane under differential pressure of 8 to 10 pounds per square inch, approximating 8 pounds per square inch.

A further embodiment of the present invention features a sheet of polyvinylidene fluoride having a nominal pore size of 0.018 to 0.03 microns, approximating 0.02 microns and a thickness of 120 microns capable of receiving approximately 0.65 ml. of water per cm² of top surface of membrane under a differential pressure of 8 to 10 pounds per square inch, approximately 8 pounds per square inch.

The microporous membranes of the present invention feature an expanded micro structure defined by globular forms interconnected to form a porous matrix. The globular forms have a length and width which length extends between globular forms. The length typically extends the diameter of the pore size. The width comprises the widest radius dimension of the globular form. A typical radius comprises 0.05 to 0.5 microns, and most preferably, approximately 0.1 micron.

Conventional processes typically produce membranes having a leafy appearance. The more robust matrix of the present invention is believed to contribute to the ability of membranes of the present invention to pass large volumes of permeate.

A further embodiment of the present invention features a method of making a microporous membrane. The method comprises the steps of providing a first solution comprising polyvinylidene fluoride polymer and a solvent: co-solvent mixture. The solvent: co-solvent mixture comprises at least one solvent selected from the group of solvents consisting of N-methyl-2-pyrrolidone, tetrahydrofuran methyl ethyl ketone, dimethylacetamide, tetramethyl urea, dirnethyl sulfoxide and trimethyl phosphate. The co-solvent is preferably selected from the group of co-solvents consisting of formamide, methyl isobutyl ketone, cyclohexone, diacetone alcohol, isobutyl ketone, ethyl acetoacetate, triethyl phosphate, propylene carbonate, glycol ethers, glycol ether esters, and n-butylacetate. The first solution is heated or maintained at a desired temperature for a particular pore size. This first solution is spread on a solid surface to form a film. The method further comprises a step of displacing the solvent: co-solvent mixture from the film with a co-solvent: non-solvent mixture. The co-solvent: non-solvent mixture comprises one or more co-solvent of the solvent: co-solvent mixture and a non-solvent. The non-solvent is mixable with one or more of the co-solvents and selected from the group of non-solvents consisting of methanol, ethanol, isopropanol and butanol. The polyvinylidene polymer forms a fixed pore structure as the solvent: co-solvent mixture is displaced by the solvent:non-solvent mixture. The fixed pore structure is separated from the solid surface to form a porous membrane.

Preferably, the co-solvent: non-solvent mixture is removed from the porous membrane. The removal of the co-solvent: non-solvent mixture is accomplished by washing the microporous membrane with water. Preferably, the microporous membrane is dried to remove the water.

Preferably, the first solution comprises 14 to 24% polyvinylidene fluoride and the co-solvent:solvent mixture.

Preferably, the solvent is N-methyl-2-pyrrolidone. Preferably, the co-solvent is butylacetate. The preferred ratio of N-methyl-2-pyrrolidone in n-butylacetate is 95% N-methyl-2-pyrrolidone and 5% n-butylacetate.

Preferably, the first solution is maintained at a temperature of 20 to 80° C. Preferably, temperature is selected for a particular desired pore size and solvent:cosolvent system. Preferably, for a membrane nominal pore size of 0.02 μm, the first solution is maintained at a temperature of 30 to 32° C. Preferably, for a membrane having a nominal pore size of 0.05 μm, the first solution is maintained at a temperature of 32 to 36° C. Preferably, for a membrane having a nominal pore size of 0.1 μm, the first solution is maintained at a temperature of 36 to 40° C. Preferably, for a membrane having a nominal pore size of 0.2 μm, the first solution is maintained at a temperature of 40 to 45° C. Preferably, for a membrane having a nominal pore size of 0.45 μm, the first solution is maintained at a temperature of 45 to 48° C. Preferably, for a membrane having a nominal pore size of 0.65 μm, the temperature of the first solution is maintained at 48 to 50° C. Preferably, for a membrane having a nominal pore size of 0.85 μm, the temperature of the first solution is maintained at 50 to 52° C. Preferably for a membrane having a pore size of 1.0 to 2.0 μm, the temperature of the first solution is maintained at 52 to 55° C. Preferably, for a membrane having a nominal pore size of 2.0 to 4.0 μm, the first solution is maintained at a temperature of 55 to 60° C. Preferably, for a membrane having a nominal pore size of 4.0 to 6.0 μm, the temperature of the first solution is maintained at 60 to 65° C. Thus, by adjusting the heat of the first solution, without changing the polymer, solvents and solids, membrane of a variety of pore sizes can be readily manufactured.

Preferably, the non-solvent is methanol or isopropanol. Preferably, the co-solvent:non-solvent mixture is n-butylacetate and methanol or n-butylacetate and isopropanol. Preferably, butylacetate comprises no more than 30% of the co-solvent: non-solvent mixture. Preferably, the co-solvent: non-solvent mixture has a temperature in the range of −10° to 50° C.

A wide variety of structural and functional properties of the membranes can be achieved in the process by selecting a temperature for either, or both, the mixing solution and formation bath and also selecting a concentration of co-solvent and non-solvent for the formation bath.

Other objects and features of the present invention will become apparent from the following detailed description when taken in connection with the following drawings. It is to be understood that the drawings are designed for the purpose of illustration only and are not intended as a definition of the limits of the invention.

BRIEF DESCRIPTION OF THE DRAWINGS

The foregoing and other objects and advantages will be more fully appreciated from the following drawings in which.

DETAILED DESCRIPTION OF THE INVENTION

A. Microporous PVDF Membranes

The present invention encompasses microporous PVDF membranes having nominal pore sizes ranging from about 0.02 microns to about 4.0 to 6.0 microns. The term "nominal pore size" refers to the minimum size of particles that will be retained on the membrane. Thus, a membrane with a nominal pore size of about 0.45 microns means that particles greater than about 0.45 microns will be retained on the membrane, those less than about 0.45 microns will pass through and will not be retained.

Functional features of membranes of the present invention differ significantly from those of conventional PVDF membranes. Specifically, the present membranes have greater liquid flow rates per unit area with equal particle retention as compared to conventionally-made PVDF membranes of the same pore size and thickness. This means that if a sample of a solution containing particles is passed through the membrane of the present invention and an equal volume sample of the same solution is passed through a conventional membrane, both membranes will retain the same amount of material, but the membrane of the present invention will have a faster flow rate and process the liquid volume in a shorter time period. Membranes of the present invention have a large surface area available at the point of contact between a molecule and the surface of the membrane. Sorbed molecules are more strongly held to the surface of present PVDF membranes. This is an advantage, for example, in immunodiagnostic applications where the goal is to cause small amounts of expensive molecules such as labeled reagents and tracers to be sorbed onto the surface of the membrane. These functional advantages are a direct result of the unique structural characteristics of the membranes of the present invention.

A scanning electron micrograph of a conventional PVDF microporous membrane (Millipore Corporation, Bedford, Mass.) of 0.22 micron nominal pore size reveals a foliate leafy appearance. These microporous membranes have a sponge-like matrix of intercommunicating passages or pores extending from one side of the membrane to the other side of the membrane. The pores provide a tortuous flow path for liquids.

Figure 1:
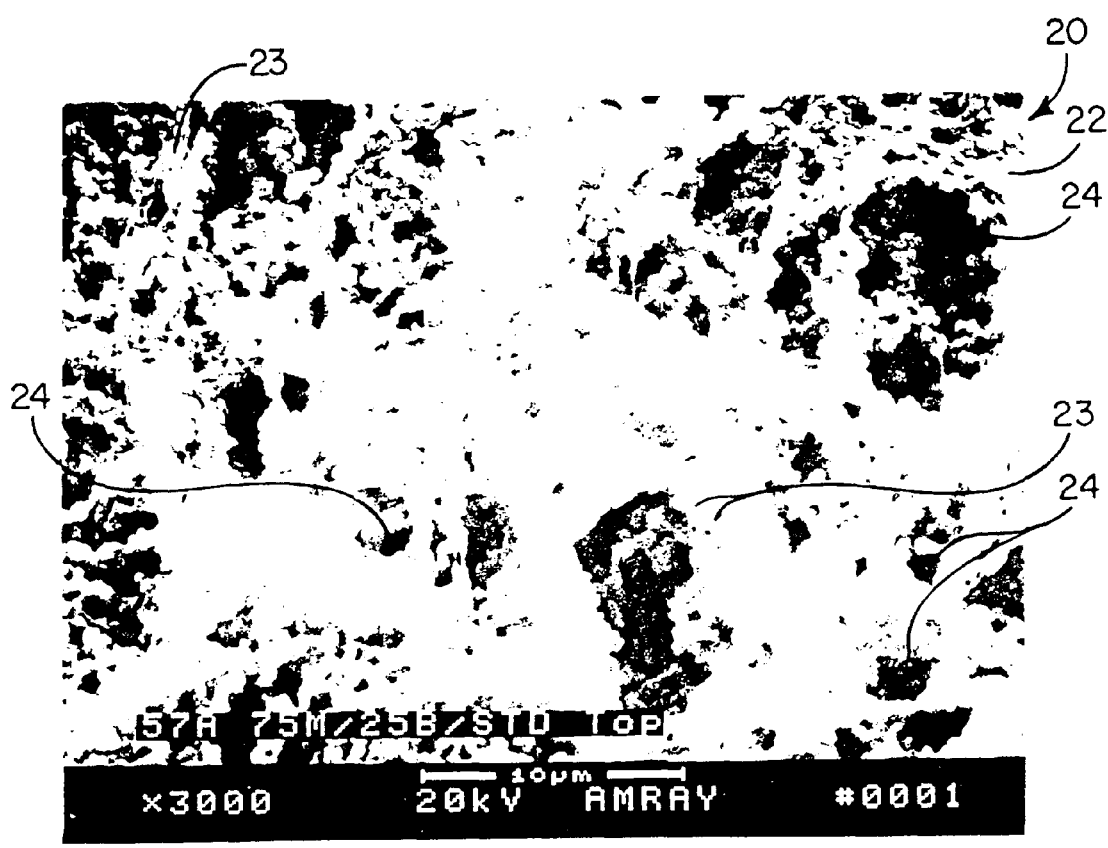
FIG. 1 is a scanning electron micrograph of the top surface of a microporous PVDF membrane of the present invention.

Referring now to FIG. 1, a scanning electron micrograph of microporous membranes made in accordance with the present method is presented. This micrograph is similar to that presented as FIG. 4 of U.S. Pat. No. 5,376,273. The scale set forth on the micrograph is 10 $\mu$m. The PVDF membrane 20 of the present invention has nominal pore size of 0.22 micron. The top surface presented on this micrograph was free from supports during the manufacturing process.

The top surface exhibits a much more rounded aspect than the leafy aspect of prior art membranes. This microstructural morphology appears as a plurality of globular bodies 23 attached to one another. The globular bodies are characterized by a diameter of 0.05 to 0.5 micron. The globular bodies are often fused or merged with each other.

The present membrane also has a unique macrostructure. The term "macrostructure" refers to morphological features of the present PVDF membranes that have dimensions substantially greater than the average pore size. FIG. 1 illustrates that, in contrast to a conventional PVDF membrane, the top surface morphology of the present PVDF membrane takes on a more cratered or pocked aspect, in which the top surface morphology is arranged in roughly spheroidal, cratered constructions 24 having a scale size of the order of about 3–4 microns. For membranes of equal pore size, membranes of the present invention feature a greater number of pores. A 0.22 micron nominal pore size membrane of the present invention will exhibit 110 to 140 pores per 100 $\mu$m$^2$ In comparison, conventional membranes exhibit 85 to 110 pores per 100 $\mu$m$^2$. Thus, membranes of the present invention exhibit 1.3 times the number of pores per unit of area.

As discussed below, microporous membranes of the present invention are formed on solid substrates in one or more non-solvent-containing formation baths. As used herein, the term "top surface" refers to that surface of the microporous membrane that is not engaged with the solid substrate. Conversely, the term "bottom surface" as used herein refers to that surface of the microporous membrane that is engaged with the solid substrate during formation.

Without wishing to be bound by any particular theory, it is believed that the particular macrostructural morphology the membrane of the present invention is due to the orientation of the PVDF molecule as the membrane is being formed in the process of the invention. The process by which the membrane of the present invention are made allow fluorine atoms of the PVDF molecules to orientate or migrate toward the outer surfaces of the globular bodies of the forming membrane.

Furthermore, it is believed that the surface orientation of the PVDF molecules results in a unique configuration of the middle of the membrane. The middle of the membrane taken from a cross-section of the interior of the membrane has a lower concentration of PVDF per unit volume as compared to the surface regions. This means that less mass of PVDF is available to be converted into a matrix of intercommunicating flow channels. Consequently, the middle portion of the membrane is believed to have a less tortuous flow path.

A cross-section of PVDF membranes of the present invention exhibit an open structure. The open structure is believed to result in a less tortuous path for fluids to flow through the membrane. This results in a decrease in the physical length of a given flow channel from the top to the bottom of the membrane. The flow path a liquid travels when it traverses the present membrane is therefore much more direct than in the more tortuous channels of conventional membranes.

In addition to the altered flow path length, described above, another unique aspect of the macrostructure of the present invention is an increased surface area. This is particularly advantageous in applications requiring transfer of one or more molecules to the membrane, since there is a greatly enhanced membrane surface area at the point of contact between a molecule resting on the surface of the PVDF membrane and the membrane itself. This is believed to result from the greater amount of surface PVDF in membranes of the present invention than in conventional membranes. Because the surface area of PVDF polymer is high at the point of contact between a molecule and the membrane surface, it is believed that sorption of a molecule onto the surface of the present membrane from a target surface or another substrate will be enhanced. The increased polymer surface area available is reflected in the cratered or pocked macrostructural features, as illustrated in FIG. 1.

The membranes of the present invention, as compared to conventional membranes exhibit greater flow rates. Presented below in Table I is a comparison between the methanol bubble points and water flow rates of the present membranes and conventional PVDP membranes of the type manufactured and sold by Millipore Corp., Bedford, Mass. The water flow rates, in milliliters/minute/square centimeter, of the present finished PVDF membranes (having a broad range of nominal pore sizes) were measured under a pressure of 8 psi.

The methanol bubble points (measured in pounds per square inch above ambient atmospheric pressure) of the present PVDF membranes are not significantly different from the methanol bubble points of conventional PVDF membranes even though the flow rates are higher in the present PVDF membranes. The term "methanol bubble point" is a well-known check on membrane performance. The bubble point test is based on the fact that liquid is held in the intercommunicating flow channels of microporous membranes by surface tension and that the minimum pressure required to force liquid out of the channels is a measure of the channel diameter. Briefly, a bubble point test is performed by prewetting the membrane with methanol on one side, applying air pressure on the other side of the membrane and watching for air bubbles emanating from the methanol-wetted side to indicate the passage of air through the membrane channels. The pressure at which a steady continuous stream of bubbles appears is the bubble point pressure. It will be appreciated that there may be an inverse relationship between the methanol bubble point and the pore diameter. Thus, for a given thickness of membrane, the higher the methanol bubble point, the smaller the effective pore diameter. The fact that the methanol bubble points are similar between the present membranes of Table I and conventional membranes suggests that the increased flow rates of the present membranes shown in Table I may be due to the present membranes having a greater number of flow channels of similar pore diameter or to flow channels with less tortuous configuration (or both) than those of conventional membranes.

TABLE I

Comparison of Preferred Microporous PVDF Membrane With Conventionally Produced Microporous PVDF Membranes

| Nominal Pore Size (microns) | Methanol Bubble Point (psi) | | Water Flow Rate (ml/min/cm²) | |
|---|---|---|---|---|
| | Present Invention | Conventional | Present Invention | Conventional |
| 5.0 | 2–3 | — | 161 | — |
| 2.0 | 1.5–2 | — | 125–190 | — |
| 0.65 | 6–8 | 6–7 | 40–50 | 38 |
| 0.45 | 10–12 | 8–10 | 20–26 | 16 |
| 0.22 | 18–21 | 17–21 | 10–12 | 6.5 |
| 0.10 | 28–32 | 28–31 | 3.6–4 | 2.9 |
| 0.05 | 40–45 | — | 1.5–2.0 | — |
| 0.02 | 50–60 | — | 0.50–0.65 | — |

In Table I above, the membranes of the present invention were characterized by a thickness of 120 microns. The conventional membranes are membranes sold under the trademark MILLIPORE®. These membranes have a thickness of 110 microns.

The microporous PVDF membranes of the present invention: (i) encompass a wider range of pore sizes as compared to currently available microporous PVDF membranes; (ii) have a flow rate substantially greater than the flow rate of conventionally-made membranes having identical thicknesses and pore sizes; and (iii) have a maximum flow rate (190 ml/min/cm²), for a 2.0 micron nominal pore size membrane, under a pressure of 8 psi, that is not achieved even in a conventional microporous PVDF membrane having more than twice the pore size.

B. The Process of Manufacture

The process of the present invention utilizes a range of solvent concentrations and temperatures to predictably form porous membranes of various pore size, polymer symmetry ratio, methanol bubble point, and water flow rate. The present process is not constrained to a single solvent when using PVDF. It does not require an initial PVDF polymer dissolution at an elevated temperature. The process does not require a formation bath at the same temperature as the initial solution.

The present method uses an initial solution of PVDF resin in a plurality of solvents. Variation of the operating parameters such as temperature and solvent concentration gives precise control over pore size, polymer symmetry ratio, flow rate, surface morphology and thickness of the membrane.

Specifically, the temperature of the initial PVDF mixing solution, the temperature of the formation bath in which the microporous membrane is formed, and/or the relative concentration of solvents, can be selected from a range of possible temperatures and solvent concentrations to effect a wide range of structural and functional changes in the PVDF microporous membrane. The temperature of the formation bath can be substantially different than the temperature of the initial mixing solution. Indeed the formation bath can be effectively used at temperatures at or below the freezing point of water (0° C.).

1. Solvent Systems

Past attempts to make microporous PVDF membranes generally involve the use of solvent materials that are volatile and are toxic. A preferred conventional formulation solvent used to initially dissolve PVDF polymer is acetone. (See, Grandine II, U.S. Pat. No. 4,203,848). Acetone is, however, only practical for use as a PVDF solvent at temperatures very close to its boiling point (5° C.). At temperatures much below about 50° C., it is difficult to get enough PVDF resin into the acetone solution for practical purposes. Thus, conventional methods for forming PVDF membranes require that PVDF resin be passed into initial solution at temperatures near 50° C. This puts severe constraints on the final product since the temperature of the initial solution, it has been discovered, has a most significant effect on the final pore size and other structural features of the microporous PVDF membrane.

One aspect of making the present microporous PVDF membranes is use of solutions comprising a solvent and preferably one or more co-solvents (i.e. a "solvent:cosolvent system"). The term "co-solvent" refers to organic solvents that dissolve PVDF resin slowly at most temperatures. Because of this, by themselves, many co-solvents are generally unsuitable for the methods of the present invention. They are often unsuitable for the additional reason that they tend to break down PVDF polymer, albeit slowly, to such an extent that the PVDF cannot reform or coagulate again in a conventional solvent-casting process.

This property of a co-solvent, surprisingly, can be utilized in the method of the present invention. An amount of co-solvent added to the solvent permits the solvent: co-solvent mixture to be combined with PVDF polymer. The mixture of the polymer in the solvent:cosolvent is applied to glass plates or other solid supports at a wide range of temperatures. The casts can be fixed in a formation bath at a wide range of temperatures; even including formation bath temperatures near zero degrees Celsius.

Co-solvents will be known to those of ordinary skill in the art. a representative list includes formamide, methyl isobutyl ketone, cyclohexanone, diacetone alcohol, diisobutyl ketone, ethylacetoacetate, triethyl phosphate, propylene carbonate, glycol ethers and glycol ether esters. A particularly preferred co-solvent is n-butylacetate.

The term "solvent", refers to organic compounds that dissolve PVDF rapidly at most temperatures. This term includes those compounds that can yield a PVDF solution of at least 25% by weight. A preferred solvent of the present invention is N-methyl-2-pyrrolidone, although other solvents can be used, such as dimethyl formamide, tetrahydrofuran, methyl ethyl ketone, dimethylacetamide, tetramethyl urea, dimethyl sulfoxide and trimethyl phosphate.

The initial dissolution of PVDF is preferably done in a solvent:co-solvent system wherein the components are miscible with each other. In preferred embodiments, the solvent is about 95% N-methyl-2-pyrrolidone, the balance being one or more selected co-solvents. A preferred co-solvent is n-butylacetate.

In preferred embodiments, at least about 50% of the formation bath is a non-solvent that is always miscible with the other components of the bath The term "non-solvent" refers to organic compounds that do not substantially dissolve PVDF at any temperature. A portion of the same co-solvent that is in the initial PVDF dissolution mixture also is preferably included. The preferred non-solvent for use in the formation bath is methanol or isopropanol. For safety reasons, isopropanol is more preferred than methanol. Other alcoholic non-solvents can be used such as ethanol, propanol and butanol provided that the non-solvent liquid is miscible with the other components in the formation bath.

The temperature of the polymer:solvent:co-solvent solutions influences the size of the pores. Surprisingly and unexpectedly, the temperature of the formation bath can be maintained at room or low temperatures without influencing the pore size. A wide variety of polymeric materials well-known in the art such as polyesters, nylons, vinyl polymers, and copolymers, polycarbonates, cellulose acetate, polysulfones and the like that can be used in solvent-casting formation procedures such as the ones described herein.

2. Apparatus and Method

Figure 2:
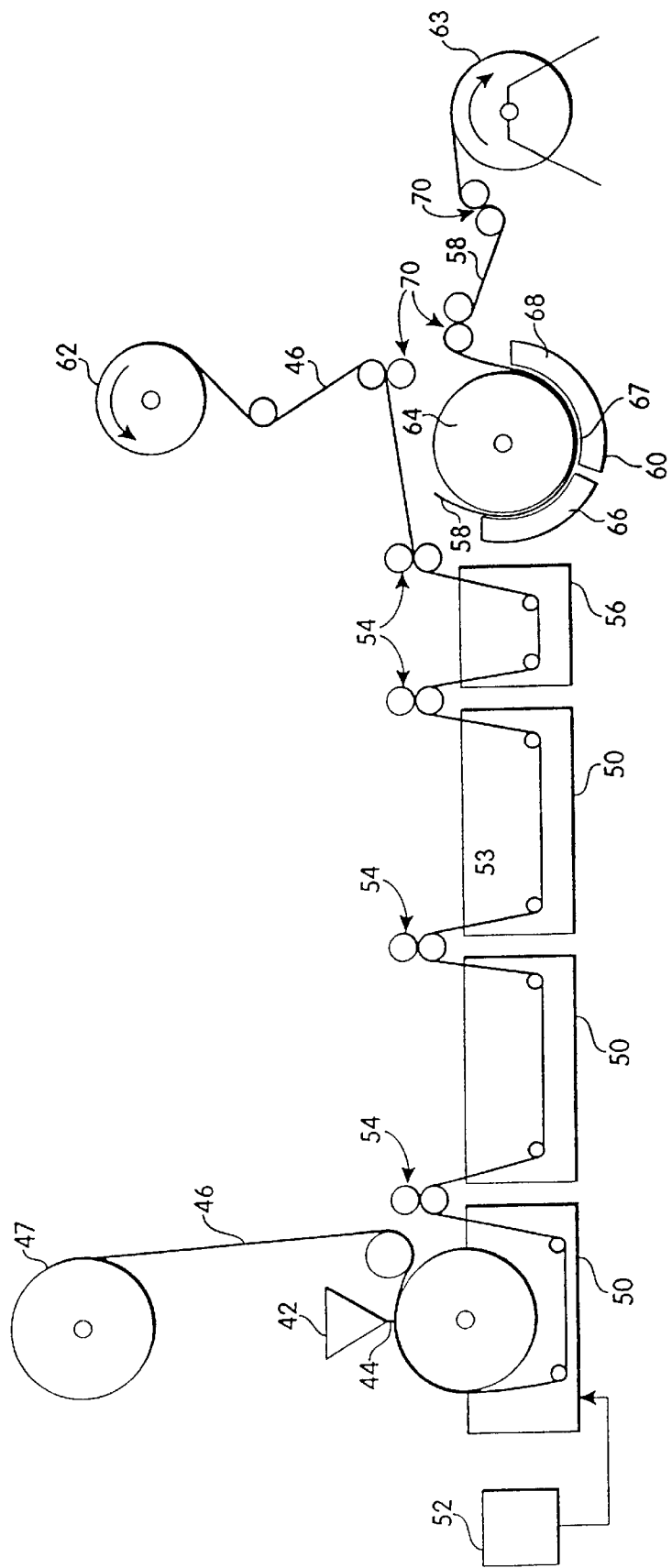
FIG. 2 is a schematic diagram of the apparatus needed for a continuous method of the present invention.

Referring to FIG. 2, equipment for production of PVDF membranes in accordance with the present invention is illustrated. The equipment comprises a mixing bath 42 for holding a supply of a PVDF polymer or resin. The mixing bath receives a PVDF polymer, a first liquid that is a solvent for the polymer, and preferably, at least one liquid that is a co-solvent for the polymer. In the mixing bath 42 a polymer:solvent:co-solvent is formed or contained. Preferably, the solvent and co-solvent are miscible at the concentration and with the polymer employed. In preferred embodiments of the invention, the first liquid solvent of the mixing bath is preferably N-methyl-2-pyrrolidone and the co-solvent is formamide and/or n-butylacetate. The polymer:solvent:co-solvent mixture is heated to a desired temperature in the mixing bath 42.

The mixing bath is provided with apparatus such as a knife blade 44 for applying a film of the dissolved PVDF polymer solution at a substantially uniform thickness onto a substrate 46. The substrate is nonporous and a polyester. The substrate is carried on a roller 47. The substrate is driven through the remainder of the apparatus by a powered take up roll 62.

During operation of the process, substrate 46 is pulled through the system by takeup roll 62. As it travels through the system, substrate 46 passes beneath the mixing bath 42, which bath includes a coating blade as a knife that is set to a predetermined gap such as, for example, 300 micrometers. a film of polymer solution is applied at a substantially uniform thickness onto the substrate that travels from its supply roll to a position underneath the knife. The film of polymer solution that is applied to the substrate forms a film-substrate laminate that is caused to travel directly into one or more formation baths. Preferably, the substrate is maintained at the same temperature as the mixing bath.

The function of the formation bath is to convert the film to a porous membrane. The film-substrate laminate remains immersed in the formation bath until the pore structure is filly formed. The laminate then travels into extraction bath 56 where much of the solvent for the polymer that may remain in a porous membrane is displaced. It will be appreciated that, although FIG. 2 illustrates several formation bath tanks 50 and a single extraction bath 56, the number of formation baths will depend upon a variety of factors. Generally, more than one formation bath is required in order to ensure that as much of the solvent as possible is removed as possible prior to separation of the formed membrane from the substrate. Thus, the solvent displaced from the membrane into the formation bath will gradually enrich the formation bath. Each successive immersion in fresh formation bath liquid will drive more of the solvent from the membrane.

A heater (not shown) heats the solvent:co-solvent solution in the bath 42 to elevated temperatures. a mixer, also not shown, adds the polymer to the solution. a separate system 52 is provided for selective heating and cooling of formation bath liquid. Cooling the formation bath can be performed by any one of a number of conventional systems, preferably provided that the cooling system can decrease the temperature of the formation bath to at least 0° C., more preferably to about −10° C., and increase the temperature of the formation bath to about 50° C.

The formation bath is maintained substantially in one or more tanks 50 of generally rectangular shape. The formation bath is a liquid that is preferably miscible with the solvent and co-solvent but is a non-solvent for the PVDF polymer. The liquid is preferably methanol or, for safety reasons, isopropanol. The remaining components of the preferred formation bath are compatible with the mixing bath and would include co-solvents such as formamide and N-butylacetate in various combinations. Any solvent present in the formation bath would be included as carry-over from the initial mixing solution.

A roller system is provided for guiding the layered substrate into, through, and out of the adjacent formation baths. Multiple baths are provided so that the layered substrate can move continuously from one bath to the other, the non-solvent in successive formation baths gradually replacing the solvent and co-solvent from the PVDF film. Such baths have associated within them a plurality of submerged rollers 53 designed to maintain tension of the laminate as it passes through the formation bath. Pairs of rollers 54 are mounted adjacent to the formation baths and after the extraction bath 56. These also apply tension to the layered substrate as the substrate travels through this section. It would be appreciated that the exact configuration of these tensioning rollers is not critical to the operation of the present invention.

Extraction bath 56 is positioned adjacent to the last formation bath and is provided with a non-solvent, preferably water. The microporous membrane 58 spontaneously separates from the moving substrate 46 when substantially all of the solvent has been displaced from the membrane and the membrane matrix is fully formed. This typically occurs in the extraction bath 56.

An extraction system 60 is positioned adjacent the final extraction bath and receives the microporous membrane 58. Extraction system 60 includes a drum 64 provided with a suction device 66 and spray head device 68. The membrane is disposed along an outer periphery of drum 64 in a substantially annular channel 67 formed by the drum and the inner surfaces of the suction 66 and spray head devices 68. Suction device 66 engages the membrane against the outer periphery of drum 64 and ensures that extraction liquid is sprayed uniformly on the membrane. The spray head 68 applies extraction liquid, preferably water, to the membrane. The water is applied under pressure and this helps to remove any remaining solvent and/or co-solvent from the pores of the membrane into the extraction system. It also removes loose particles of polymer that are on the surface of the membrane. This is important since any loose, surficial particles may cause punctures in the membrane if not removed at this stage.

After traveling through extraction bath 56, the membrane 58 can be separated from the substrate 46. Although FIG. 2 illustrates separation of the membrane after passage through a plurality of formation bath tanks, it will be appreciated that the separation of the membrane can be achieved in a single tank depending upon the solvent concentration and the amount of non-solvent available to displace the solvent. Once separation occurs, the used substrate 46 is passed under a tension roll 70 and then onto a takeup roll 62. Membrane 58 is similarly passed through a series of membrane tension control rolls 70 to a driven windup roll 63.

Extraction system 60 provides for in-line extraction and drying. Membrane travels over the outer surface of drum 64. Suction is applied to the surface of the drum to constrain the membrane against shrinkage and movement. a series of spray heads is disposed along one arcuate segment of the drum to apply extraction liquid to the membrane and displace any solvent remaining in the membrane. When suction is used, all or part of the sprayed liquid is drawn directly through the membrane into the drum by the applied suction and any liquid that drips down may be caught in a separate tray (not shown).

In the final area of the drum, heat can be applied to the membrane. This may be accomplished by heating the drum using a device not shown such as an infrared heater, by blowing hot air onto the membrane, or by a combination of these and other steps. The dried membrane is then wound on a windup roll.

The final drying stage preferably involves a heat treatment. Heating anneals the membrane. The annealing step includes heating the membrane above its expected temperature of use to ensure that the membrane is dimensionally stable when used. The operating temperatures of PVDF membranes of the present invention range from about 0 to about 100° C. Since the polymer has a melting point of about 160° C., a good annealing temperature is about 130° C. The best annealing temperature is one that is closest to the melting point of a particular grade of PVDF without actually melting the polymer.

The invention will now be described further by means of several specific examples of preferred embodiments. In the following examples, all parts and percentages are by weight unless otherwise specified and temperatures are in degrees Celsius.

Example 1
Production of PVDF Microporous Membranes of Various Sizes

This example illustrates the unique versatility of the present manufacturing process and its ability to manufacture microporous PVDF membranes using control of temperature and preselected solvent composition to produce desired membrane characteristics.

The membranes were formed by hand on 6"×8" glass plates. Briefly, an initial solution of PVDF polymer: solvent: co-solvent were mixed and applied to the glass plate using a coating blade having a gap width of 15 thousands of an inch. The coated, glass plate was immersed in a formation solution and the membrane was allowed to form on the glass plate. The formation solution comprised solvent and a non-solvent mixture. Once formed, the membranes were dried at about 50° C. on the glass plates and membrane discs were produced using a 47 mm diameter punch. The membrane thickness was measured as well as the water flow rate (ml/min/cm$^2$) and methanol bubble point (psi) using standard procedures.

A. Effect of Mixing Temperature and Co-Solvent Composition

An initial weight of PVDF polymer (see below) was mixed with 94–95% N-methyl-2-pyrrolidone and 5–6% n-butylacetate at temperatures of 20° C., 35° C., 40° C., and 45° C. The formation bath was maintained at about 20° C. The formation bath comprises of methanol (nonsolvent) and N-methyl-2-pyrrolidone (co-solvent) or n-butylacetate (co-solvent) concentrations. After the PVDF polymer was dissolved at different initial temperatures, membranes were formed in these different formation bath solutions. The thickness, water flow rate, and methanol bubble point of the membranes produced under these various conditions was determined on the extracted and dried membranes. The results for measurement of the water flow rate are presented below in Table II for 375–398 gm PVDF, (Kynar® 761, Atochem North America, Philadelphia, Pa.), used at different mixing solution temperatures and different solvent:co-solvent concentrations of the formation bath (20° C.). Results for water flow measurement are presented in Table III for 375–398 gm Kynar® 761, PVDF used at different mixing solution temperatures and different solvent:cosolvent concentrations in the formation bath (20° C.).

TABLE II

| Mixing Temperature (° C.) | Flow Rate (ml/min/cm$^2$) (mean ± s.e) | | |
|---|---|---|---|
| | MeOH (100%) | MeOH:BA[a] (90:10) | MeOH:.N-Pyrrol (90:10) |
| 20 | 0.40 | 0.50 | 1.8 |
| | 0.39 | 0.53 | 1.7 |
| | 0.395 ± .007 | 0.515 ± 0.02 | 1.75 ± .007 |
| 35 | 1.9 | 4.2 | 2.1 |
| | 1.6 | 4.1 | 2.5 |
| | 1.75 ± 0.21 | 4.15 ± .007 | 2.3 ± .28 |
| Thickness (mm) mean ± s.e | | | |
| 20° C. | 160 | 100 | 112 |
| | 161 | 100 | 114 |
| | 160.5 ± .007 | 100 | 113 ± 1.4 |
| 35° C. | 100 | 102 | 96 |
| | 100 | 105 | 101 |
| | 100 | 103.5 ± 2.1 | 98.5 ± 3.5 |
| Bubble Point (psi) (mean ± s.e.) | | | |
| 20° C. | 57 | 52 | 37 |
| | 58 | 51 | 38 |
| | 57.5 ± .70 | 51.5 ± .70 | 37.5 ± .70 |
| 35° C. | 36 | 32 | 35 |
| | 40 | 31 | 37 |
| | 38 ± 2.8 | 31.5 ± .70 | 36 ± 1.4 |

[a]MeOH = methanol; BA = n-butylacetate

TABLE III

Water Flow (ml/min/cm²)

| Mixing Temperature (° C.) | Methanol (100%) | MeOH:BA[a] (90:10) | MeOH:BA (80:20) | MeOH:BA (75:25) | MeOH:BA:H₂O (55:25:20) |
|---|---|---|---|---|---|
| 20 | 1.6 | 3.2 | 5.0 | 5.4 | 4.3 |
|  | 1.5 | 4.1 |  | 4.4 | 4.6 |
|  | 1.2 |  |  |  |  |
|  | 1.1 |  |  |  |  |
| 35 | 5.1 | 7.3 | 6.2 | 9.5 |  |
|  | 4.2 | 7.8 |  | 10.0 |  |
|  | 5.1 | 7.3 |  | 9.4 | 12 |
|  | 4.9 |  |  |  |  |
|  | 4.3 |  |  |  |  |
|  | 4.5 |  |  |  |  |
| 40 | 20 |  | 23 |  |  |
|  |  |  | 23 |  |  |
|  |  |  | 27 |  |  |
| 45 | 173 |  | 173 |  |  |
|  | 161 |  |  |  |  |
|  | 156 |  |  |  |  |

[a]MeOH = methanol;
BA = n-butylacetate

B. Effect of Formation Bath Temperature and Formamide

A series of initial mixing solutions were made up at 4° C. as follows:

Solution A:

Kynar® 761: 400 gm
N-pyrrol: 2250 gm
n-butylacetate: 100 gm
Formamide: 100 gm
solids = 14% of total weight Solution B:

Kynar® 761: 400 gm
N-pyrrol: 2350 gm
Formamide: 100 gm
solids = 14% of total weight Membranes were formed in temperature-controlled formation baths at 0° C. and 20° C. In addition, the formation bath contained a series of decreasing methanol concentrations and increasing formamide concentrations (100% MeOH; 75:25 and 50:50 MeOH:Formamide). Membranes were formed, removed from the plate, and dried as above and their water flow rate, thickness and methanol bubble point were measured. Results are presented in Table IV. The dashed line indicates that a membrane did not form.

Use of formamide as a co-solvent results in formation of a PVDF membrane having the flattened macrostructure.

TABLE IV

Water Flow (ml/min/cm²)

| Formation Bath (° C.) | Methanol (100%) | | 75% MeOH: 25% Formamide | | 50% MeOH:50% Formamide | |
|---|---|---|---|---|---|---|
|  | A | B | A | B | A | B |
| 0 | 20 | 6.4 | 14 | 6.6 | — | — |
|  |  |  | 17 |  |  |  |
| 20 | 0.35 | 1.8 | 0.4 | 5.0 | Membrane Collapsed | 2.1 |

Thickness (mm)

| (° C.) | A | B | A | B | A | B |
|---|---|---|---|---|---|---|
| 0° C. | 88 | 86 | 167 | 139 | — | — |
|  |  |  | 82 |  |  |  |
| 20° C. | 81 | 86 | 70 | 147 | — | 83 |

Bubble Point (psi)

| (° C.) | A | B | A | B | A | B |
|---|---|---|---|---|---|---|
| 0° C. | 12 | 23 | 17 | 25 | — | — |
|  |  |  | 14 |  |  |  |
| 20° C. | 60 | 35 | 65 | 30 | — | 34 |

Initial mixing solution:
A. N-pyrrol/Butylacetate/Formamide
B. N-pyrrol/Formamide The temperature of the polymer:solvent:co-solvent mixture prior to formation has a great influence on membrane properties (Tables II and III). For any given formation bath composition, the bubble point is lowered by increasing the temperature of the initial mixing solution (Table II). This results in a dramatic increase in flow rate as the mixing solution temperature is increased from 20° C. to 45° C. (Table III).

Moreover, the temperature of the formation bath may also effect the membrane properties, particularly with co-solvents such as N-butylacetate and formamide. As the formation bath temperature increases, the resulting membrane shows a decreased water flow rate and increased bubble point (Table IV). Cooling the formation bath down to about 0° C. while the membrane is being formed results in the opposite effect; a significantly decreased bubble point and increased flow rate (Table IV).

Generally, a warmer mixing solution and formation bath results in significantly increased rate of exchange of non-solvent for co-solvent in the pores of the forming membrane than at lower temperatures. Further, the dissolution of the polymer in the initial solvent is also faster at higher temperatures. This may result in a higher number of intercommunicating flow channels and a more tortuous flow path for liquid travel. This is reflected in the higher methanol bubble point.

Preferred operating ranges include a PVDF polymer concentration in the range of between about 14% to 24% by weight of the initial mixing solution at a preferred temperature range of between about 20° C. and about 50° C. The initial solution preferably contains this weight of PVDF polymer in a mixture of 95% N-pyrrol and 5% butylacetate. The most preferred operating conditions for production of PVDF membranes of the present invention have a co-solvent concentration in the formation bath no greater than about 30%. The formation bath solution is made up at a temperature in the range of −10° C. to 50° C.

Example 2

This Example features the making of microporous membranes having nominal pore sizes of 0.02, 0.05, 0.10, 0.02, 0.45, 0.65, 0.85, 1.0 to 2.0, 2.0 to 4.0, and 4.0 to 6.0. A first solution comprising the polymer solvent and co-solvent was formed. This first solution comprising 18–22 weight percent PVDF (Kynar® 761, PVDF, Atochem North America, Philadelphia, Pa.) in a solvent:co-solvent mixture. The solvent:co-solvent mixture comprised 95% by volume N-methyl-2-pyrolidone and 5% n-butylacetate. The first solution was heated to a temperature within a preferred temperature range to form a membrane having a desired pore size. These temperatures and pore sizes are summarized in Table V below. The first solution, at the desired temperature, is spread on a 6"×8" glass plate using a coating blade having a gap width of 15 thousands of an inch to form a film of the first solution. Preferably, the glass plates are preheated to the desired temperature prior to the spreading step.

A formation solution comprising 30% n-butylacetate and 70% methanol was prepared. The formation solution was maintained at room temperature. The glass plates with the film of the first solution was immersed in the formation solution. The formation solution displaces the solvent:co-solvent mixture to form a sheet of microporous membrane of the present invention. The membranes were separated from the glass plates and dried at about 50° C. Then, using a 47 mm diameter punch, membrane discs were formed. The membranes have an approximate thickness of 120 microns. Each membrane pore size exhibited a characteristic water flow rate, and isopropanol bubble point (IPA BP).

These results are summarized in Table V below.

TABLE V

| PORE SIZE μM | HEAT DEGREES C. | IPA BP LBS/PSIG | H2O FLOW MLS/MIN/CM2 |
| --- | --- | --- | --- |
| .02 | 30–32 | 75–90 | .3–.8 |
| .05 | 32–36 | 45–55 | 1.8–2.2 |
| .10 | 36–40 | 25–30 | 3.5–4.5 |
| .20 | 40–45 | 17.5–20 | 12–14 |
| .45 | 45–48 | 10–12 | 30–40 |
| .65 | 48–50 | 7–20 | 50–60 |
| .85 | 50–52 | 5–7 | 60–100 |
| 1.0–2.0 | 52–55 | 3–5 | 100–140 |
| 2.0–4.0 | 55–60 | 1–3 | 150–240 |
| 4.0–6.0 | 60–65 | .25–1.0 | 240–380 |

Microporous membranes of the present invention that are produced in accordance herewith are particularly useful in the chemical, food and pharmaceutical industries. One particular use, in filters with pore sizes on the order of about 0.1 microns or less, is the removal of viruses and large macromolecules from the fluids being processed through the membrane. Because PVDF is chemically inert, the membrane may be steamed sterilized repeatedly.

Another useful industrial application of the present membranes is in tangential or cross-flow filtration systems. In tangential or cross-flow filtration systems, not all of the liquid volume goes through the membrane. Some fraction of the filtrate volume can be removed and recycled. Tangential flow systems characteristically use tube-shaped filters or cartridges where the flow is moved axially through the tube and material is released transversely across the walls of the tube. Tangential flow can be used at lower pressures than normal filtration and the longevity of the filter is enhanced in this way. Because the flow rates of the membranes of the present invention are significantly faster than those of conventional membranes of equal thickness, tangential flow using the present membranes is particularly advantageous because the time for processing a given volume of sample having a given particle concentration will be much faster than processing using conventional membranes.

Furthermore, membranes of the present invention can be produced as a polyester supported PVDF membrane where the polyester is encapsulated as the PVDF membrane is formed. A particularly preferred type of PVDF membrane, however, is a PVDF fibrous support in which the PVDF fibers are integrally formed with the PVDF polymer as the microporous membrane is produced.

Equivalents

It should be understood that the foregoing description of the invention is intended merely to be illustrative thereof, that the illustrative embodiments are presented by way of example only, and that other modifications, embodiments, and equivalents may be apparent to those skilled in the art without departing from its spirit.

We claim:

1. A method of making a microporous membrane, comprising:
   a) providing a first solution comprising polyvinylidene fluoride polymer and a solvent: co-solvent mixture, said solvent:co-solvent mixture comprising at least one solvent selected from the group of solvents consisting of N-methyl-2-pyrrolidone, dimethyl formamide, tetrahydrofuran, methyl ethyl ketone, dimethyl acetamide, tetramethyl urea, dimethyl sulfoxide and trimethyl phosphate, and at least one co-solvent selected from the group of co-solvents consisting of formamide, methyl isobutyl ketone, cyclohexone, diacetone alcohol, diisobutyl ketone, ethyl acetoacetate, triethyl phosphate, propylene carbonate, glycol ethers, glycol ether esters, and n-butylacetate, and heating said first solution to a temperature corresponding to a desired pore size;
   b) spreading said first solution on a solid surface to form a film of said first solution;
   c) displacing said solvent: co-solvent mixture from said film with a co-solvent: non-solvent mixture, said co-solvent: non-solvent mixture comprising said at least one co-solvent of said solvent: co-solvent mixture and a non-solvent, said non-solvent miscible with said at least one co-solvent and selected from the group of non-solvents consisting of methanol, ethanol, propanol and butanol, said polyvinylidene polymer forming a fixed pore structure as said solvent: co-solvent mixture is displaced by said co-solvent: non-solvent mixture;
   d) removing said co-solvent: non-solvent mixture from said porous membrane by displacement with a non-solvent; and
   e) separating said fixed pore structure from said solid surface to form a porous membrane, wherein the heating in step a) corresponds to a temperature range associated with the group of temperatures and pore sizes consisting of 30–32° C. and a pore size of 0.03 to 0.081 micron. 32–36° C. and a pore size of 0.03 to 0.06 micron, 36–40° C. and a pore size of 0.08 to 0.112 micron, 40–45° C. and a pore size of 0.14 to 0.22 micron, 45–48° C. and a pore size of 0.45 micron, 48–50° C. and a pore size of 0.60 to 0.85 micron, 50–52° C. and a pore size of 0.85 micron, 52–55° C. and a pore size of 1.0 to 2.0 micron, 55–60° C. and a pore size of 2.0 to 4.0 micron, and 60–65° C. and a pore size of 4.0 to 6.0 micron.

2. The method of claim 1 wherein the co-solvent:non-solvent mixture removal step comprises washing said microporous membrane with water.

3. The method of claim 2 wherein said microporous membrane is subsequently dried to remove said water.

4. The method of claim 1 wherein said first solution comprises 14 to 24% polyvinylidene fluoride.

5. The method of claim 1 wherein said at least one solvent is N-methyl-2-pyrrolidone.

6. The method of claim 1 wherein said at least one co-solvent is n-butylacetate.

7. The method of claim 1 wherein said solvent:co-solvent mixture is 95% N-methyl-2-pyrrolidone and 5% n-butylacetate.

8. The method of claim 1 wherein said first solution is maintained at a temperature of about 20° to 65° C.

9. The method of claim 1 wherein said non-solvent is methanol.

10. The method of claim 1 wherein said non-solvent is isopropanol.

11. The method of claim 1 wherein said co-solvent:non-solvent mixture is n-butylacetate and methanol or n-butylacetate and propanol.

12. The method of claim 11 wherein said n-butylacetate comprises no more than 30% of said co-solvent:non-solvent mixture.

13. The method of claim 1 wherein said co-solvent:non-solvent mixture has a temperature in the range of −10° to 50°.

14. A microporous membrane made by the process of claim 1.

* * * * *